US005515461A

United States Patent [19]
Deri et al.

[11] Patent Number: 5,515,461
[45] Date of Patent: May 7, 1996

[54] POLARIZATION-INDEPENDENT OPTICAL WAVELENGTH FILTER FOR CHANNEL DROPPING APPLICATIONS

[75] Inventors: Robert J. Deri, Pleasanton; Frank Patterson, Livermore, both of Calif.

[73] Assignee: The Regents of the University of California, Oakland, Calif.

[21] Appl. No.: 262,716

[22] Filed: Jun. 20, 1994

[51] Int. Cl.$^6$ ................................................ G02B 6/26
[52] U.S. Cl. .............................. 385/30; 385/27; 385/41; 385/42; 385/131
[58] Field of Search ............................... 385/11, 41, 42, 385/27, 131, 30, 1

[56] References Cited

U.S. PATENT DOCUMENTS

| | | |
|---|---|---|
| 4,146,297 | 3/1979 | Alferness et al. . |
| 4,390,236 | 6/1983 | Alferness ................................ 385/9 |
| 4,533,207 | 8/1985 | Alferness ................................ 385/11 X |
| 4,737,007 | 4/1988 | Alferness et al. . |
| 4,759,595 | 7/1988 | Boord et al. ........................... 385/21 |
| 4,904,045 | 2/1990 | Alferness et al. . |
| 5,031,989 | 7/1991 | Morishita et al. . |
| 5,090,790 | 2/1992 | Zucker ................................... 385/8 X |
| 5,140,149 | 8/1992 | Sakata et al. . |
| 5,220,573 | 6/1993 | Sakata et al. . |
| 5,233,187 | 8/1993 | Sakata et al. ........................... 385/37 X |
| 5,253,314 | 10/1993 | Alferness et al. . |

OTHER PUBLICATIONS

Alferness et al., Tunable Optical Waveguide Directional Coupler Filter, Appl. Phys. lett. 33(2) pp. 161–163 (1978).
Broberg et al., A Novel Integrated Optics Wavelength Filter in InGaAsP–InP, J. Lightwave Tech., vol. LT-4, No. 2 pp. 196–203 (1986) Feb.
Rolland et al., A Vertically Coupled InGaAsP/InP Directional Coupler Filter of Ultranarrow Bandwidth, IEEE Photonics Tech. Ltrs., vol. 3, pp. 519–521 (1991) no month.
Sakata et al., Grating-Assisted Directional Coupler Filters Using AlGaAs/GaAs MQW Waveguides, IEEE Photonics Tech. Ltrs., vol. 3, No. 10 pp. 899–901 (1991) no month.
Sakata et al., Electron. Lett. 28, pp. 749–750 (1992) no month.
Sakata et al., Wavelength tuning in a grating-assisted vertical coupler filter using quantum well electrorefraction, App. Phys. Lett. 59, vol. 24, pp. 3081–3083 (1991) no month.
Sakata, Sidelobe suppression in grating-assisted wavelength-selective couplers, Optics Lett., vol. 17, No. 7, pp. 463–465 (1992) no month.
Chuang et al., Photonic integrated tunable receivers with optical preamplifiers for direct detection, Appl. Phys. Lett. 63, vol. 7, pp. 880–882 (1993) no month.
Alferness et al., Grating-assisted InGaAsP/InP vertical codirectional coupler filter, App. Phys. Lett., vol. 55, No. 19 pp. 2011–2013 (1989) no month.
Alferness et al., Broadly tunable InGaAsP/InP buried rib waveguide vertical coupler filter, Appl. Phys. Lett. 60(8), pp. 980–982 (1992) no month.

(List continued on next page.)

Primary Examiner—Rodney B. Bovernick
Assistant Examiner—Yisun Song
Attorney, Agent, or Firm—Henry P. Sartorio; John P. Wooldridge

[57] ABSTRACT

The polarization dependence of optical wavelength filters is eliminated by using waveguide directional couplers. Material birefringence is used to compensate for the waveguide (electromagnetic) birefringence which is the original cause of the polarization dependence. Material birefringence is introduced in a controllable fashion by replacing bulk waveguide layers by finely layered composites, such as multiple quantum wells using III–V semiconductor materials. The filter has use in wavelength-division-multiplexed fiber optic communication systems. This filter has broad application for wavelength-tunable receivers in fiber optic communication links, which may be used for telecommunications, optical computer interconnect links, or fiber optic sensor systems. Since multiple-wavelength systems are increasingly being used for all of these applications, the filter is useable whenever a rapidly tunable, wavelength-filtering receiver is required.

31 Claims, 7 Drawing Sheets

OTHER PUBLICATIONS

Alferness et al., Vertically coupled InGaAsp/InP buried rib waveguide filter, Appl. Phys. Lett. 59(20), pp. 2573–2575 (1991). no month.

Alferness et al., Tunable optical waveguide directional coupler filter, Appl. Phys. Lett. 33(2) pp. 161–163 (1978). no month.

Koch et al., Wavelength selective interlayer directionally grating–coupled InP/InGaAsP waveguide photodetection, Appl. Phys. Lett. 51 (14) pp. 1060–1062 (1987) no month.

Allferness et al., Broadly tunable InGaAsP/InP laser based on a vertical coupler filter with 57–nm tuning range, Appl. Phys. Lett. 60(26) pp. 3209–3211 (1992) no month.

Kim et al., InGaAs/InGaAsP MQW Optical Amplifier Integrated with Grating–Assisted Vertical–Coupler Noise Filter, IEEE Photonics Tech. Lett., vol. 5, No. 11 pp. 1319–1321 (1993) no month.

Heismann et al., Polarization–independent wavelenth filter using a grating–assisted vertical directional coupler in InP, Appl. Phys. Lett 64(18), pp. 2335–2337 (1994) no month.

| DESIGN | ABRUPT INDEX CHANGES | GRADED INDEX CHANGES |
|---|---|---|
| UPPER CLADDING THICKNESS $t_{CLAD}$ | > ±13% | > ±13% |
| UPPER CORE THICKNESS $t_{TOP}$ | ±8% | ±11% |
| LOWER CORE THICKNESS $t_{MQW}$ | ±11% | ±13% |
| MQW WELL-TO-BARRIER THICKNESS RATIO $t_1/t_2$ | ±10% | ±7% |
| $Al_{0.2}GaAs$ COMPOSITION $\Delta x$ | ±0.042 | ±0.074 |
| $Al_{0.5}GaAs$ COMPOSITION $\Delta x$ | ±0.040 | ±0.070 |

POLARIZATION-INDEPENDENT OPTICAL WAVELENGTH FILTER FOR CHANNEL DROPPING APPLICATIONS

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates generally to wavelength-division-multiplexed fiber optic communication systems, and more specifically, to the elimination of polarization dependence in wavelength filters.

2. Description of Related Art

The enormous bandwidth of optical fibers currently cannot be fully utilized by employing a single data stream, because this bandwidth exceeds that of the transmitter and receiver electronics required to interface the fiber to external electronic systems. For this reason, various types of multiplexing are being considered for increasing the amount of information that can simultaneously be transmitted over a single fiber cable. Wavelength-division-multiplexing (WDM) is straightforward to implement and offers an extremely flexible way to configure optical fiber networks for telecommunications, data communications, and sensor systems. In the WDM approach, several data streams of moderate speed are carried on a single fiber by encoding each data stream with light of a different wavelength. In order to implement WDM, wavelength-tunable transmitters and/or receivers are required. In general, the receivers must incorporate tunable filters which satisfy the criteria that:

(1) the filter must have rapid tunablility (appreciably faster than one microsecond) for many applications, to allow for rapid network reconfiguration;

(2) the filter must have narrow optical passbands (less than 15 nm), so that many data streams, each at a different wavelength, can be simultaneously transmitted within the wavelength range over which the fiber operates;

(3) polarization-independent filtering is required, so that fiber-induced polarization fluctuations of the optical datastreams do not cause noise in the received signal; and (4) the filter should select only a single data stream so that the filter removes light only at a single wavelength, while permitting light at other wavelengths to pass unaltered through the device (known as a "channel dropping filter").

Wavelength filters for fiber optics are generally fabricated from either bulk optical components (gratings, interference filters, etc.) or optical fibers (eg: fiber Fabry-Perot resonators). These devices can be polarization independent, but can only be tuned slowly (because tuning is performed by mechanically adjusting the device). Slow mechanical tuning is unsuitable for many WDM networks. Fast tunability is achievable only by using electro-optic or acousto-optic effects, which in turn require waveguide device geometries in order to minimize the magnitude of the tuning signals. Devices without waveguides typically exhibit short interaction lengths, and thus require very high voltages, currents, or acoustic powers in order to vary their wavelengths. However, the waveguide geometry required for fast tunablility also introduces polarization sensitive behavior. That is, the optical filter response depends on the polarization of the input signals due to waveguide birefringence phenomena. Such polarization dependence renders these components useless for most fiber communications, since fibers currently deployed for telecommunication and data communication do not preserve polarization, and polarization-preserving fiber systems are significantly more expensive. When used with non-polarization-preserving (ie: conventional) fibers, CDF polarization sensitivity converts random fiber polarization noise (due to microphonics, etc.) into amplitude noise, garbling the transmitted signal and making the link unusable.

Previous work on such channel dropping filters has often employed asymmetric waveguide directional couplers, in which light is transferred between two spatially-separated waveguides by a wavelength-dependent interaction. The basic concept of an asymmetric waveguide coupler (Alferness & Schmidt, Appl. Phys. Lett. 33, 161,1978 and U.S. Pat. No. 4,146,297; also Morishita et al, U.S. Pat. No. 5,031,989) is to bring two waveguides of different refractive index distributions and core thicknesses into proximity, such that light can couple from one waveguide to another. Because of the structural differences between the waveguides, this coupling occurs only for a specified wavelength. This means the device functions as a wavelength channel dropping filter. If several optical signals at different wavelengths are launched into a single-waveguide, the signal at one wavelength is coupled to the second waveguide of the coupler, while all other wavelengths remain in the same waveguide. The advantage of the waveguide-type design (as compared to bulk optics), is that it enables the use of a long device length, which in turn enables one to tune the filter by electro-optic effects. The electro-optic effects are generally so weak that a long interaction length is required for wide wavelength tuning range; without the waveguide structure, the optical signal would tend to diffract out of the filter and could not be effectively affected by the electrooptic tuning. This basic design has been demonstrated by several different research groups (Alferness & Schmidt, Appl. Phys. Lett. 33, 161, 1978, Broberg et al., J. Lightwave Technol. 4, 196, 1986, Wu et al., Photon. Technol. Lett. 3, 519, 1991).

Figure 1A:
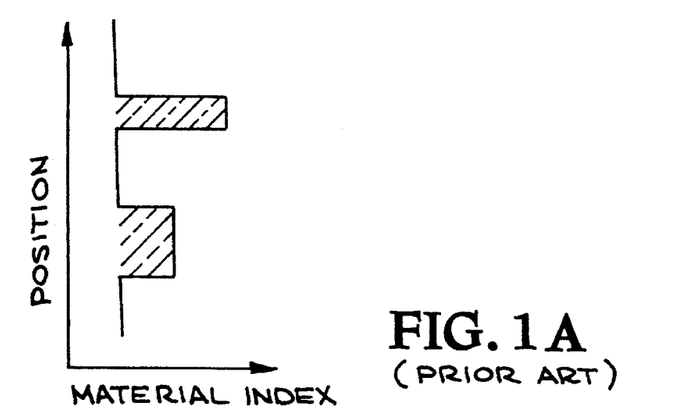
FIG. 1A shows the refractive index spatial profile for a prior art channel dropping filter.
Figure 1B:
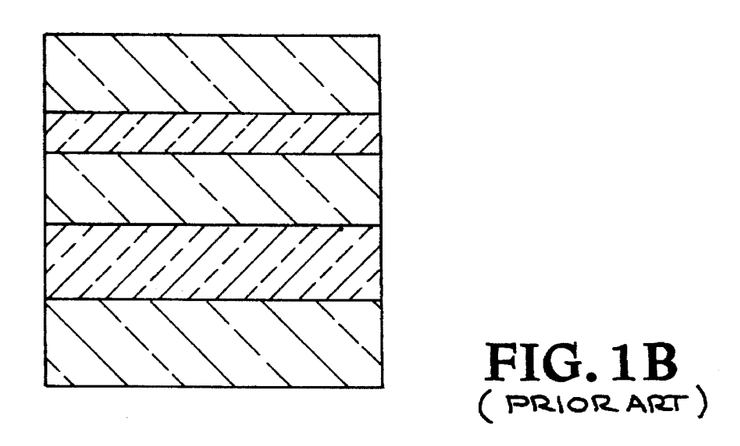
FIG. 1B shows a top view of the filter of FIG. 1A.
Figure 1C:
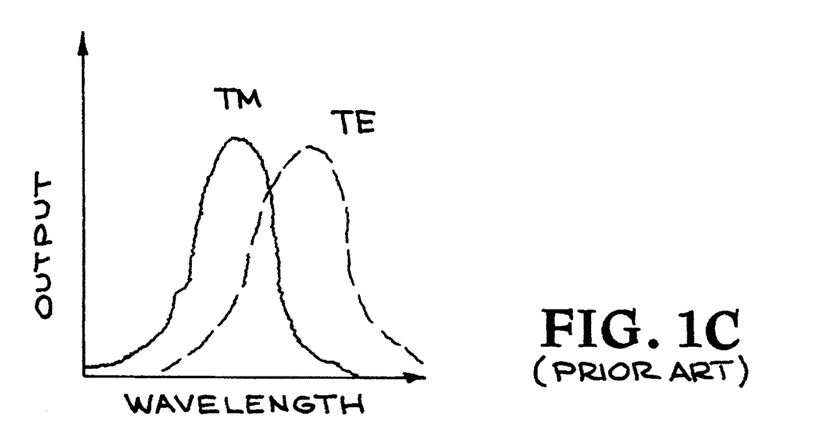
FIG. 1C shows the wavelength filtering response for two orthogonal polarizations passing through the filter of FIG. 1A.
Figure 2A:
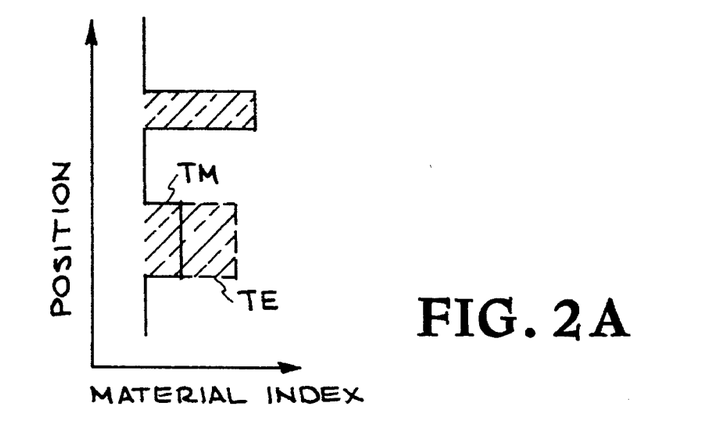
FIG. 2A shows the refractive index spatial profile with replacement of one of the waveguide materials with a layered composite.
Figure 2B:
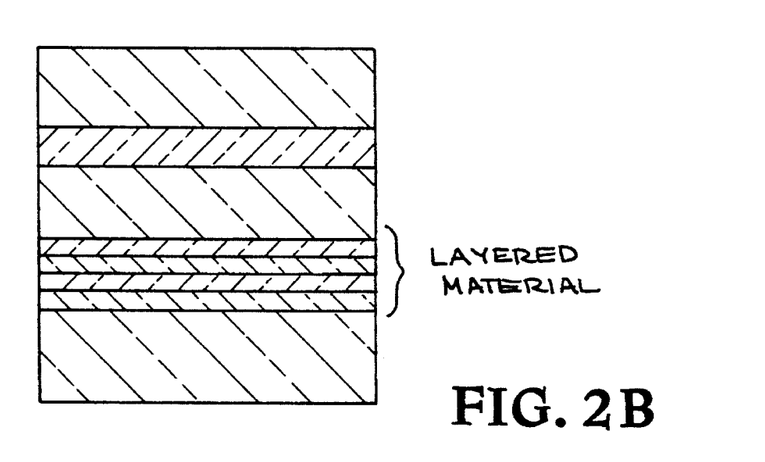
FIG. 2B shows a top view of the filter of FIG. 2A.
Figure 2C:
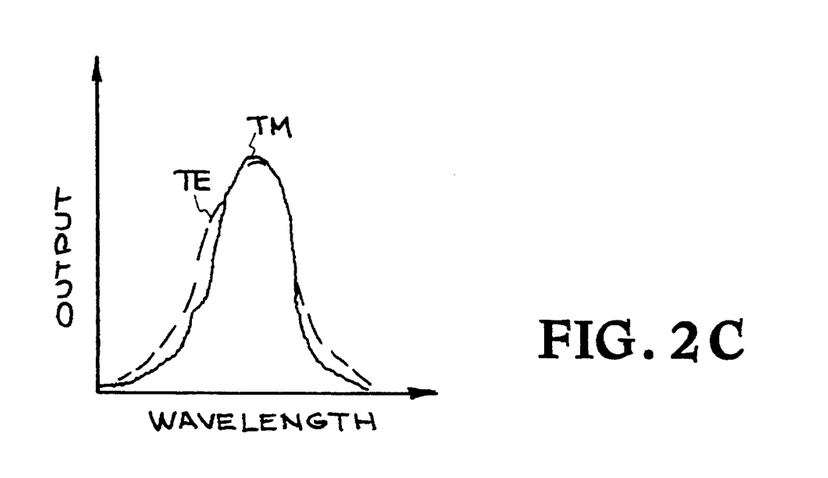
FIG. 2C shows the wavelength filtering response for two orthogonal polarizations passing through the filter of FIG. 2A.

FIGS. 1A–C shows a prior art filter. FIG. 1A shows the refractive index spatial profile n(x,y). FIG. 1B shows a top view of the two waveguides of the device. FIG. 1C shows the wavelength filtering response for two orthogonal polarizations ("TE" and "TM"). The filtering interaction can be the directional coupling phenomenon itself, or coupling assisted by a superimposed diffraction grating which can be structural (built-in), or generated by acousto-optic effects.

The diffraction grating can improve device performance, ie: reduce the filter passband or increase filter tunability. This has been described by Sakata and Takeuchi (Photon. Technol. Lett. 3, 899, 1991), Chuang et al. (Appl. Phys. Lett. 63, 880, 1993) and Alferness et al. (Appl. Phys. Lett. 55, 2011, 1993, and U.S. Pat. Nos. 4,737,007, 5,253,314, and 4,904,045).

In all cases, efficient coupling of light between the two waveguides requires that they be phase matched, that is, that their wavelength-dependent modal refractive indices $n_{1,2}(\lambda)$ be related by $n_1(\lambda)=n_2(\lambda)\pm p\,\lambda/L$ where $\lambda$ is the free-space wavelength, p is an integer, and L is the grating pitch for grating-coupled devices. Because non-identical guides are used in the coupler, $n_1$ and $n_2$ differ, so that the above equation is satisfied and channel dropping occurs for only a single wavelength $\lambda CD$. In general, waveguide birefringence results in different values of the indices $n_{1,2}$ for different polarizations of the optical input. Moreover, the polarization dependence is different for $n_1$ and $n_2$, which in turn causes $\lambda CD$, and thus the wavelength filtering, to be polarization-dependent. This behavior is shown schematically for a conventional device in FIG. 1C.

Integration of these coupler filters with additional optoelectronic devices such as lasers or photodetectors has been suggested and/or demonstrated by several researchers. Integration of these coupler filters with photodetectors has been demonstrated by: Sakata et al (Electron. Lett. 28, 749 1992 and U.S. Pat. Nos. 5,233,187 and 5,140,149), and Koch et al. (Appl. Phys. Lett. 51, 1060, 1987). Integration of these coupler filters with lasers has been demonstrated by: Nojiri and Sakata (U.S. Pat. No. 5,220,573), and Alferness et al (Appl. Phys. Lett. 60, 3209, 1992). Optical amplifiers and detectors have been integrated with coupler filters by: Chuang et al. (Appl. Phys. Lett. 63, 880, 1993) and Kim et al. (Photonics Technol. Lett. 5, 1319, 1993). Multiple-quantum well modulators have been used to create refractive index differences (electro-optic effects) which tune a selected filter wavelength by: Alferness et al. (U.S. Pat. No. 4,904,045), Sakata and Takeuchi (Appl. Phys. Lett. 59, 3081, 1991).

Heismann et al. (Appl. Phys. Lett. 64, 2335, 1994) have demonstrated a polarization-insensitive channel dropping filter using a double-periodic grating-assisted-coupler design. While this approach achieves polarization-insensitive performance, it also involves several undesirable features: it is restricted to grating-assisted devices, the double periodicity introduces secondary filter responses at undesired wavelengths, and the design increases the overall size (length) of the coupler device.

SUMMARY OF THE INVENTION

It is an object of the present invention to provide a method for designing polarization-independent optical wavelength filters for channel dropping filter (CDF) applications.

It is also an object of the present invention to provide polarization-independent optical wavelength filters for channel dropping applications.

The present invention obtains polarization-independent performance from directional coupler CDF devices. By introducing a birefringent material into one of the two waveguides of a directional coupler CDF device, material birefringence compensates for the "electromagnetic" waveguide birefringence. A layered composite material, with layer dimensions much smaller than a wavelength, operates as an equivalent bulk material which is birefringent. Replacing one of the waveguide materials with a layered composite achieves a polarization-independent device. This approach is implemented using III-V semiconductor materials, because these materials permit the CDF to be integrated with other optoelectronic components. The layered material used to obtain birefringence compensation is a so-called "multiple quantum well." Our use of multiple quantum wells in these devices serves a totally different purpose than their use in prior art, i.e., to enhance the electrooptic tuning of the filter wavelength by Alferness et al. (U.S. Pat. No. 4,904,045) and Sakata and Takeuchi (Appl. Phys. Lett. 59, 3081, 1991). The prior art does not meet our birefringence cancellation conditions, and prior art devices containing multiple quantum wells remained highly polarization-sensitive, as described by Sakata and Takeuchi (Appl. Phys. Lett. 59, 3081, 1991).

This invention is not restricted to III–V semiconductor materials; however, and also applies to other materials in which layered composites can be formed. A second example involves the use of composites consisting of alternating layers of different glasses (eg: $TiO_2$ and $SiO_2$), which can be deposited by chemical vapor deposition or sputtering. This invention also applies to grating-assisted couplers, in which either an etched grating is inserted between the two interacting waveguides or an acousto-optically generated grating is used to phase-match the waveguides.

Because this invention permits polarization-independent filtering while maintaining a waveguide coupler structure for the filter, it will meet all the performance criteria outlined above, i.e., it will provide a narrow filter bandwidth, fast filter tuning and channel dropping, without compromising polarization independence.

DETAILED DESCRIPTION OF THE INVENTION

The invention is a polarization-insensitive, optical wavelength filter based on an asymmetric waveguide directional coupler design. The device comprises at least two optical waveguides of differing core refractive indices and thicknesses, brought into proximity such that light can couple from one waveguide to the other(s), either with or without gratings placed between the coupled waveguides, with the core of at least one waveguide replaced by a multilayer stack of composition (refractive index and thickness of each multilayer component) selected to cancel the intrinsic birefringence of the waveguiding structure.

The class of filters to which this invention applies includes all of the following:

(i) a simple combination of two different waveguides which form an optical directional coupler;

(ii) the combination of (i), plus a grating which couples in a manner which preserves the direction in which optical signals propagate (co-propagating); and (iii) the combination of (ii), plus a grating which couples in a manner which flips the propagation direction of the coupled light (counter-propagating, contra-directional coupling).

This invention is not restricted to any single asymmetric coupler type listed above. It applies to devices with and without gratings, and grating-assisted devices with both co- and contra-directional coupling, and is not restricted to any particular set of materials. It is suited to any set of optically transparent materials which can be deposited onto a planar substrate. These include the III–V compound semiconductor alloys AlGaAs, InGaAsP, and InGaAlAs, as well as insulating materials such as doped and undoped silicon dioxide, silicon nitride, aluminum oxide. It is not restricted to two-component multilayers, but also includes multilayers with 3 or more constituents.

The invention pertains to planar waveguiding structures in which waveguiding confines light only to a plane parallel to the propagation directions. Included within the invention are channel waveguide structures in which additional waveguiding is used to confine light within a two-dimensional channel parallel to the propagation directions. The invention is not restricted to any particular optical wavelength. It is expected to find most use for optical fiber communications, which are currently performed at optical wavelengths from 0.78 to 1.6 microns. It is useable with integrated assemblies such as optical amplifiers and can be used to filter light prior to entry in a photodetector. The invention is not restricted to stacking the coupled waveguides "vertically" (perpendicular to the plane of the substrate). It can also be used for couplers stacked laterally (stacking parallel to the plane of the substrate).

The invention is not restricted to filters employing only two coupled waveguides. It also includes multiple coupled waveguides—either stacked in parallel or in series. The invention applies to filter devices fabricated from materials where additional birefringence results from bulk material birefringence (eg: strain-induced piezo-optic effects, field-induced electro-optic effects, and similar effects) as well as from the waveguiding phenomenon. The same approach can be used to eliminate polarization sensitivity.

The invention consists of replacing the (typically homogeneous) material of the wider waveguide core with a multilayer stack, with the stacking direction perpendicular to the optical coupling direction. The birefringence of the stack can then be adjusted to compensate for the birefringence induced by the waveguiding phenomenon, which is the cause of undesirable polarization-dependent behavior. Mathematically, this can be described as follows:

Let the modal indices of the two waveguides be $N_{top}$, $N_{bot}$. Each of these indices will depend on polarization due to the waveguiding phenomenon, and the total birefringence affecting filter performance will be $$\Delta N_{pol}, \text{waveguide} = N_{top}^{TE} - N_{top}^{TM} - N_{bot}^{TE} + N_{bot}^{TM},$$

where TE and TM indicate the two orthogonal polarization states of the input light. The filter center wavelength will shift with polarization, by an amount proportional to $\Delta N_{pol}$. This invention is an approach to minimize $\Delta N_{pol}$ and so make the filter insensitive to input polarization.

The wider (here assumed to be the bottom) waveguide has the least birefringence. By introducing a multilayer stack for the core of this bottom (wider) waveguide, its birefringence, $N_{bot}^{TE} - N_{bot}^{TM}$, is increased to match that of the top waveguide. For example, a multilayer composed of several periods, with each period containing two materials of indices $n_a$ and $n_b$, each of thickness $d_a$ and $d_b$, will behave as a birefringent homogeneous material if $d_a + d_b$ is much less than the optical wavelength. The material birefringence is described by $$n^{TE} = [(d_a n_a^2 + d_b n_b^2) \div (d_a + d_b)]^{1/2}, \text{ and } n^{TM} + 1/[(d_a n_a^2 + d_b n_b^2) \div (d_a + d_b)]^{1/2}.$$

These equations are known from the electromagnetic theory of layered media. After insertion of the multilayer, the change in modal birefringence of the wider waveguide will be $\Delta N_{pol}$,multilayer $= G (n^{TE} - n^{TM})$, where G is defined by overlaps of the optical field E of the waveguide mode with the core material:

$$G = \int_{core} E^* E \, dx / \int E^* E \, dx,$$

where the numerator integral is taken over the bottom waveguide core, and the bottom integral is taken over the entire waveguide. Appropriate choice of the core thickness and multilayer parameters $(d_a, n_a, d_b, n_b)$ using these equations will give $\Delta N$pol,waveguide=$\Delta N$pol,multilayer, which will result in a polarization-insensitive device. The same design approach can be applied to materials which exhibit birefringence due to strain or electric fields, which may result from fabrication conditions ("built-in" fields) or externally applied fields, provided that the strain- and/or field-induced birefringence is included in the calculation of the waveguide modal indices and the composite material birefringence.

There are several design rules which make this approach easier to realize in practice:

1. Minimize the sensitivity of the narrower waveguide's birefringence $N_{top}^{TE} - N_{top}^{TM}$ to changes in structural parameters, to improve fabrication tolerances for the overall device. To minimize these tolerances, one wants to choose the thickness of the thinner waveguide core to maximize the birefringence $N_{top}^{TE} - N_{top}^{TM}$, which is counter-intuitive. The core thickness for optimal tolerance is close to the core thickness which minimizes the waveguide mode size (spatial extent of the waveguide mode).

2. Grade the refractive index "step" between the cladding and core of the narrower waveguide. Typically, an abrupt change in refractive index is used for prior-art devices at the interface between core and cladding layers. However, by grading this interface (gradual variation of index with position), $N_{top}^{TE} - N_{top}^{TM}$ is reduced, which can simplify the design of the bottom waveguide. In particular, there are two advantages to this approach:

(i) it allows one to use materials for the multilayer $(n_a, n_b)$ which are identical to the materials of the cladding material and the upper waveguide core material. This improves tolerances, because errors in material composition control on any layer affect both waveguides in a comparable fashion.

(ii) it allows one to use multilayer materials which both have refractive indices greater than that of the cladding material. In contrast, abrupt index changes in the upper guide require one multilayer material in the lower guide to have an index below that of the cladding. This is important for certain material systems in which no suitable material is available with an index below that of the cladding. An example is InGaAsP on an InP substrate, where the InP cladding and substrate have the lowest index.

3. For a design using only two materials in the multilayer, choose a structure for which $d_a \approx d_b$. This improves the tolerances, because it makes $\Delta N$pol,multilayer less sensitive to variations in $d_a$ and/or $d_b$.

4. In general, the invention only insures that the filter wavelength is polarization-independent, but not the magnitude of the filter coupling loss. To minimize this effect, a filter length half-way between the optimum lengths for each polarization is chosen. This makes the magnitude almost independent of polarization.

Figure 3A:
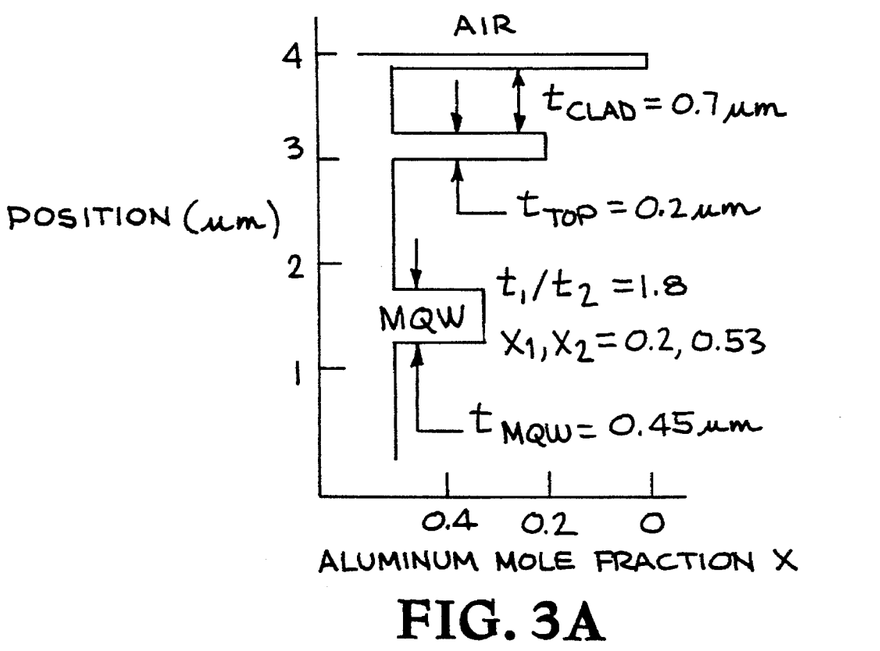
FIG. 3A shows an embodiment of a polarization-insensitive channel dropping filter comprising $Al_xGaAs$ for $\lambda_{CD}=$ 827 nm with abrupt index steps.
Figure 3B:
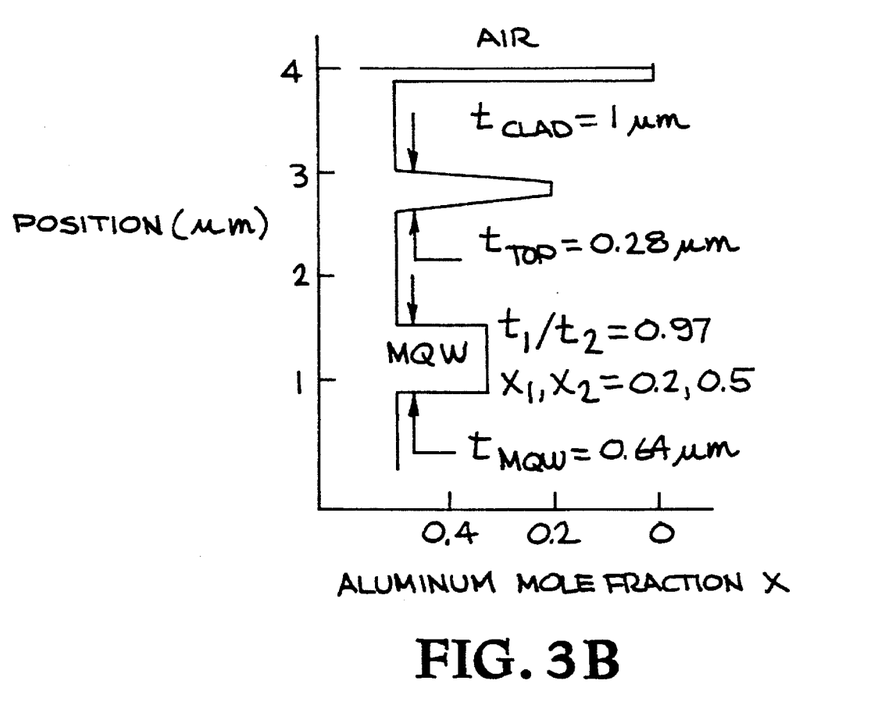
FIG. 3B shows an embodiment of a polarization-insensitive channel dropping filter comprising $Al_xGaAs$ for $\lambda_{CD}=$ 827 nm with graded index steps in the top (narrower) waveguide.

FIGS. 3A and 3B show two embodiments of $Al_xGaAs$ filters for $\lambda^{CD}=827$ nm. Filter performance was evaluated using conventional eigensolving algorithms to determine planar guide modal indices n. The filter bandwidth $\Delta\lambda$, and polarization sensitivity $\Delta\lambda_{POL}$ are evaluated from $\Delta\lambda_{pol}=\lambda N_{pol}/s$ and $\Delta\lambda$, $=0.8\lambda_{CD}/sL_c$, where $L_c$ is the coupler beat length, $s=\partial n_{top}/\partial\lambda - \partial n_{bot}/\partial\lambda$ is the differential dispersion, and $\alpha$Npol $=N_{top}TE-N_{bot}TE-N_{top}TM+N_{bot}TM$.

The schematics shown in FIGS. 3A–B show transverse structure (composition vs. position). The devices use a top waveguide core with x=0.2 and either abrupt (A) or graded (B) index steps. The bottom waveguide consists of a multilayer MQW (alternating layers of x1 and x2 composition and thickness ratio t1/t2), and the cladding and substrate consist of x=0.5 bulk alloy. The topmost layer is a 60 Å GaAs cap layer.

Figure 4:
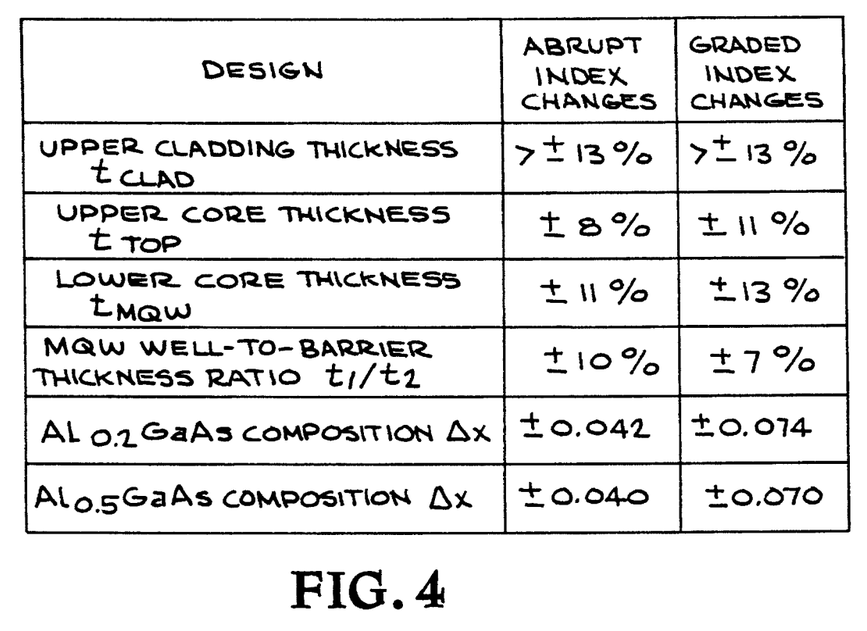
FIG. 4 is a table showing layer thickness tolerances and $Al_xGaAs$ composition tolerances for the abrupt index step design of FIG. 3A and the graded index step design of FIG. 3B.

The filter of FIG. 3A (employing only abrupt index changes) exhibits a bandwidth of $\Delta\lambda=2.9$ nm FWHM for L=3.8 mm. This bandwidth is comparable to previous reports for polarization-sensitive devices, and can be significantly reduced by using grating-assisted coupling. Tolerances on layer thicknesses and $Al_xGaAs$ composition x to maintain a polarization insensitivity $\Delta\lambda_{pol}/\Delta\lambda<0.25$ are shown in FIG. 4 (values in FIG. 4 consider only single parameter variations, not simultaneous variation of multiple parameters). These tolerances are achievable using today's epitaxial growth technology, indicating that such a device is practical to fabricate.

Polarization-insensitive designs based on abrupt index changes (FIG. 3A) require that one MQW constituent have an index below that of the waveguide cladding (Al mole fraction x=50% in FIG. 3A). The tolerance shown in FIG. 4 for variations in the $Al_{0.5}GaAs$ composition assumes that both the x=50% cladding and the x=53% MQW constituent vary in the same manner due to errors in epitaxial growth. This assumption is reasonable due to the very similar compositions of the two materials. However, not shown in two materials: $x_{clad}-x_{MQW}$ must not exceed $5\times10^{-3}$. This control is possible FIG. 4 is the precise control necessary for the relative compositions of these using epitaxial techniques, but it clearly requires state-of-the-art technology.

A design based on graded index changes (FIG. 3B) can alleviate the compositional control issue associated with the abrupt index change design. Grading the index profile in the upper waveguide reduces its birefringence, which enables the cladding material to be used as an MQW constituent. Using a sinusoidal grading, the design of FIG. 3B achieves $\Delta\lambda=3.7$ nm FWHM for L=2.5 mm. FIG. 4 shows that the tolerances for this design are practical using epitaxy technology. Notably, composition tolerances become much less severe ($\Delta x=0.04$ causes $\Delta\lambda_{pol}/\Delta\lambda=0.06$) than for the ungraded index step design of FIG. 3A.

Figure 5:
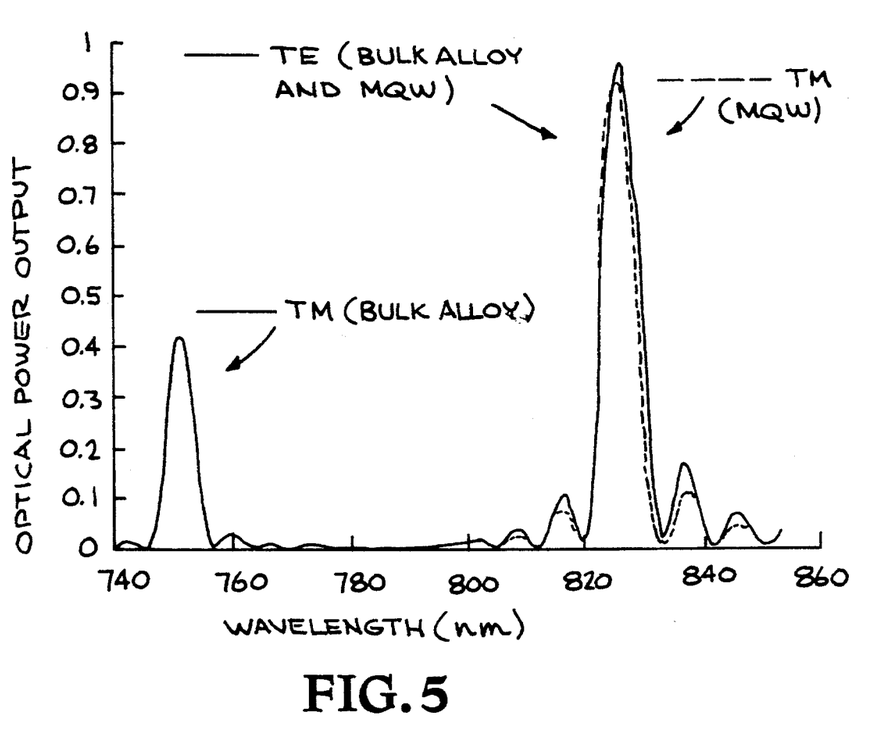
FIG. 5 shows the filter response for the device of FIG. 3B, indicated by TE and TM (MQW), and the filter response for an equivalent prior art device, indicated by TE and TM(bulk alloy).

FIG. 5 shows the filter response calculated for the device of FIG. 3B with a propagation simulation using a supermode basis set, which has accurately simulated other vertical coupler devices. The device clearly exhibits polarization-insensitive behavior ($\Delta\lambda_{pol}/\Delta\lambda<0.06$), in contrast to a prior art device using a bulk AlGaAs alloy for the lower waveguide core. FIG. 5 also shows that the device insertion loss is small (<0.2 dB) for both polarizations. FIG. 5 shows filter response calculated for the device of FIG. 3B (dashed curve TM) and for a corresponding prior-art device with the lower waveguide core composed of bulk AlGaAs alloy (solid curve TM). The effect of material dispersion is not included in this calculation.

Figure 6:
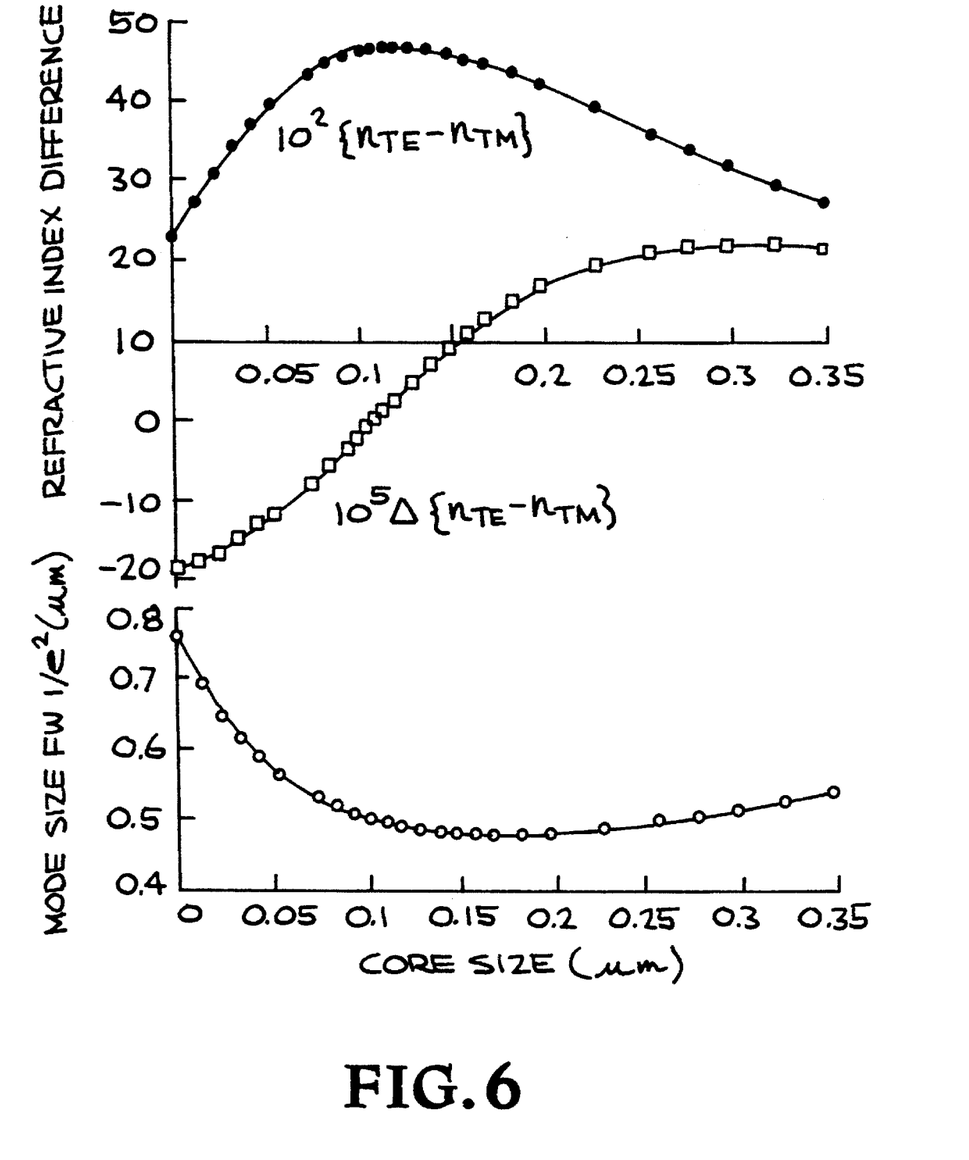
FIG. 6 shows effects of thickness changes in the central (ungraded) portion of the upper waveguide core in a graded index step device.

FIG. 6 shows how thickness changes in the ungraded portion of the upper waveguide core affect the performance of the graded index step device of FIG. 3b. The optimum thickness for the ungraded portion of the core occurs at about 0.11 µm; at this value, the birefringence change due to a 5% variation in the total core thickness $\Delta(N^{TE}-N^{TM})$ is minimized. Minimum birefringence variation corresponds to maximal tolerances on fabrication of the upper waveguide. The optimum core geometry can also be estimated by determining conditions which minimize mode size or maximize the birefringence $n_{TE}-n_{TM}$ of the upper waveguide.

Figure 7:
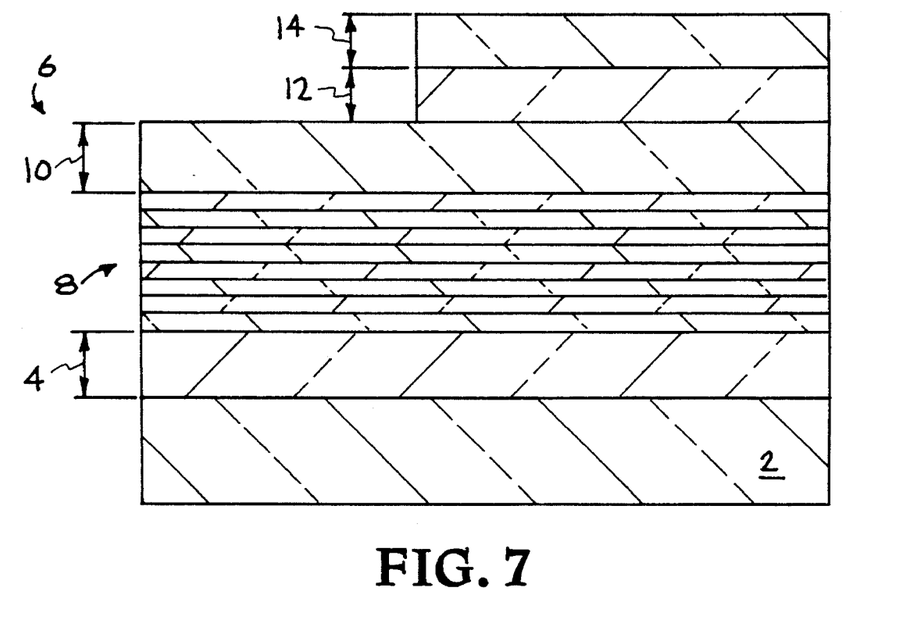
FIG. 7 shows a polarization-insensitive channel dropping filter having a filter passband of $\approx 7$ nm.

Referring now to FIG. 7, substrate 2 comprises n$^+$GaAs. The first layer 4, which is the lower cladding of the first waveguide 6, comprises $Al_{0.5}Ga_{0.5}As$, and has a thickness of 0.65 µm. A multiplicity of layers 8, which are the core of first waveguide 6, comprises 17 layers, and each of these layers comprises $Al_{0.6}Ga_{0.4}As$ having a thickness of 11.5 nm and $Al_{0.2}Ga_{0.8}As$ having a thickness of 38.5 nm. A final upper cladding layer 10 of the first waveguide comprises $Al_{0.5}Ga_{0.5}As$, and has a thickness of 0.75 µm. A second waveguide 12 adjacent to the first waveguide 6 at layer 10 comprises an $Al_{0.2}Ga_{0.5}As$ core 12 of thickness 0.34 µm. and an upper cladding 14 adjacent to the second waveguide core 12, comprising $Al_{0.5}Ga_{0.5}As$, and has a thickness of 0.17 µm. The filter is typically located in air.

The embodiment shown in FIG. 7 exhibits a filter passband expected to be ≈7 nm, centered at a filter wavelength of 827 nm, using a device length of 1084 µm. The filter wavelength changes by ≈0.4 nm with polarization; since this change is much smaller than the passband, the filter is polarization-insensitive. Propagation simulations also show that the magnitude of the coupling at 827 nm is better than 95% for both polarizations. In contrast, a similar filter without the multilayer in the lower guide shows a 91 nm change in filter wavelength; since this change is much larger than the passband, the filter is highly polarization sensitive.

The major concern with the embodiment shown in FIG. 7 is that it is relatively sensitive to fabrication errors. For example, a 3% change in the upper waveguide core thickness can cause a polarization-sensitivity of 4 nm, which is comparable to the passband and therefore introduces moderate polarization sensitivity (≈3 dB). This intolerance to fabrication error arises from not following design rule number 1.

Figure 8:
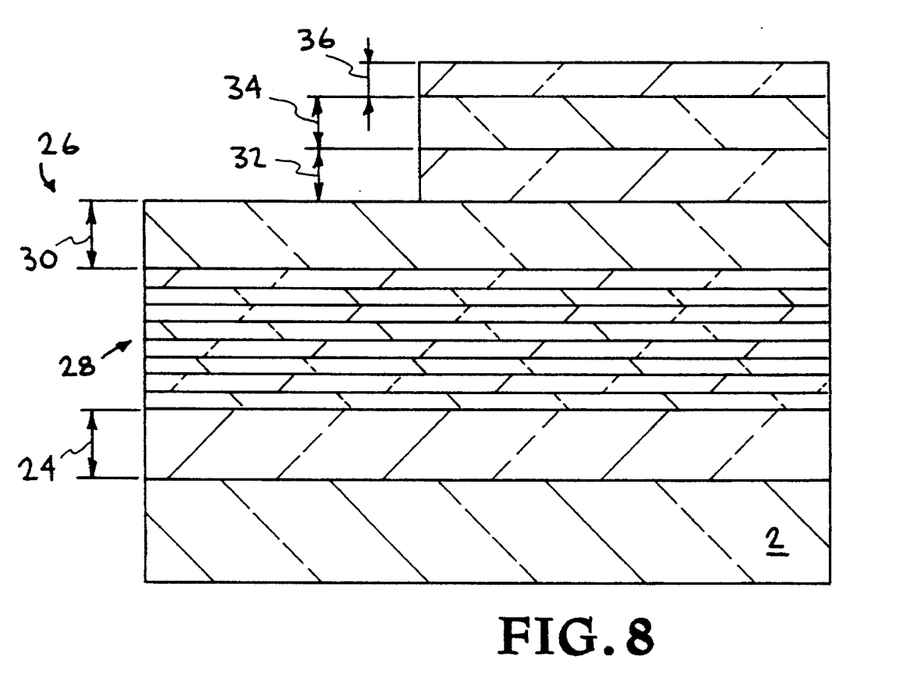
FIG. 8 shows a polarization-insensitive channel dropping filter having a filter passband of $\approx 5$ nm.

FIG. 8 shows an improvement to the embodiment of FIG. 7. It exhibits a filter passband expected to be ≈5 nm, centered at a filter wavelength of 827 nm, using a device length of 3.8 mm. It exhibits the same polarization-insensitivity as the ideally-fabricated embodiment FIG. 7. However, the embodiment of FIG. 8 is much less sensitive to fabrication variations, because design rule numbers 1 and 3 have been followed. For example, an 8% change in the upper waveguide core thickness causes a polarization-dependent shift in filter wavelength which is no more than ¼ of the filter passband (very moderate polarization dependence of ≈1 dB). A similar polarization dependence is caused by a change in any single material composition corresponding to ±0.04 in Aluminum mole fraction. These tolerances are achievable using epitaxial growth techniques.

Referring now to FIG. 8, substrate 2 comprises n⁺GaAs. The first cladding layer 24 of the first waveguide 26 comprises $Al_{0.5}Ga_{0.5}As$, and has a thickness of 1.3 μm,. A multiplicity of layers 28 of first waveguide 26 comprises 10 layers, and each of these layers comprises $Al_{0.53}Ga_{0.47}As$ having a thickness of 28.6 nm and $Al_{0.2}Ga_{0.8}As$ having a thickness of 15.9 nm. A final cladding layer 30 of the first waveguide comprises $Al_{0.5}Ga_{0.5}As$, and has a thickness of 1.33 μm. A second waveguide core 32 adjacent to the first waveguide 26 at layer 30 comprises $Al_{0.2}Ga_{0.8}As$, and has a thickness of 0.20 μm. The upper cladding 34 of the second waveguide, adjacent to the second waveguide core 32, comprises $Al_{0.5}Ga_{0.5}As$, and has a thickness of 0.7 μm. An outer layer 36, adjacent to the third waveguide 34 comprises GaAs and is 0.06 μm.

The major concern with the embodiment of FIG. 8 is that it requires a multilayer material (0.53 Aluminum mole fraction) with an index below that of the cladding material (0.50 Aluminum mole fraction). This means that this design cannot be translated to certain material systems for which the cladding has the lowest refractive index, such as InGaAsP materials on InP.

Figure 9:
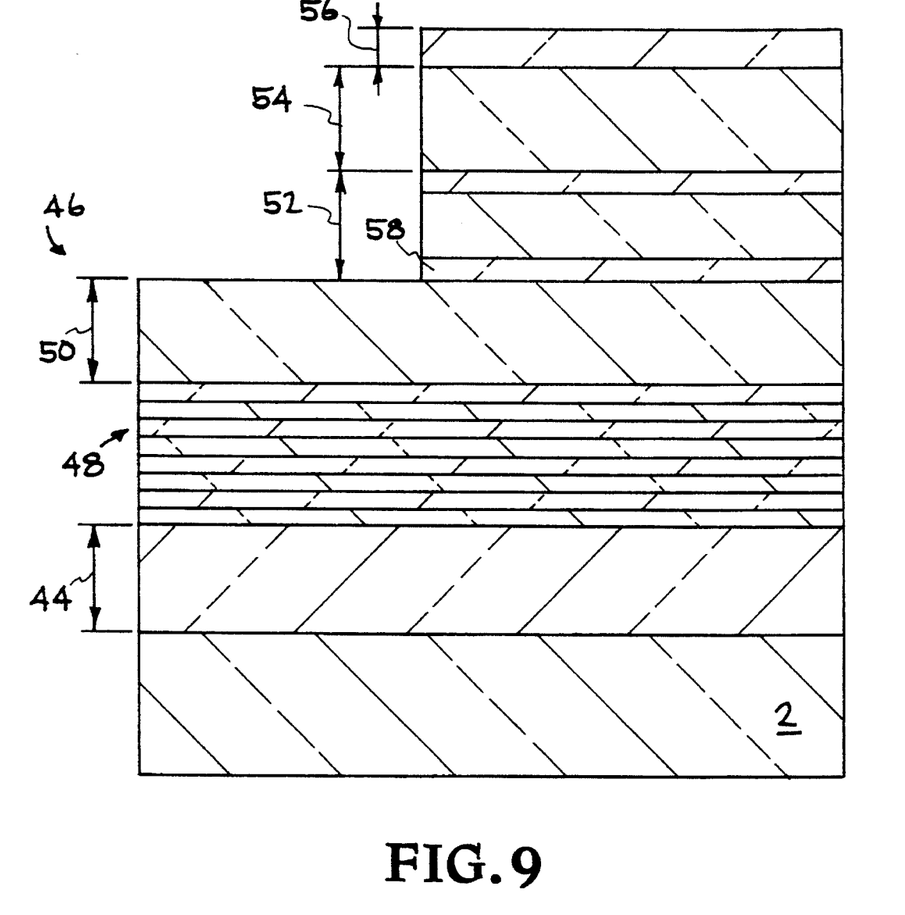
FIG. 9 shows a polarization-insensitive channel dropping filter having a filter passband of $\approx 6$ nm, using the graded index step design of FIG. 3B.

FIG. 9 shows an embodiment which employs graded refractive index steps at the interfaces between the core and cladding of the upper (narrower) waveguide. The grading is described by $x(y)=x_{clad}+(x_{core}-x_{clad})*(1-\cos\{\pi y/w\})/2$, where $x_{clad}=0.5$ is the cladding composition (Aluminum mole fraction), $x_{core}=0.2$ is the core composition, x is the composition in the graded region, y is the position in the material, and w=0.09 μm is the thickness of the graded region. It exhibits a filter passband expected to be ≈6 nm centered at a filter wavelength of 827 nm, using a device length of 2.5 mm. It exhibits the same polarization-insensitivity as the embodiments discussed above. However, this embodiment is less sensitive to fabrication variations, because design rule number 2 has been followed. For example, an 11% change in the upper waveguide core thickness causes a polarization-dependent shift in filter wavelength which is no more than ¼ of the filter passband (very moderate polarization dependence of ≈1 dB). A similar polarization dependence is caused by a change in any single material composition corresponding to ±0.07 in Aluminum mole fraction. These tolerances are achievable using epitaxial growth techniques.

Referring to FIG. 9, substrate 2 comprises n⁺GaAs. The first cladding layer 44 of the first waveguide 46 comprises $Al_{0.5}Ga_{0.5}As$, and has a thickness of 1.06 μm. A multiplicity of layers 48 of first waveguide 46 comprises 20 layers, and each of these layers comprises $Al_{0.50}Ga_{0.50}As$ having a thickness of 15.7 nm and $Al_{0.2}Ga_{0.8}As$ having a thickness of 16.2 nm. A final cladding layer 50 of the first waveguide 46 comprises $Al_{0.5}Ga_{0.5}As$, and has a thickness of 1.16 μm. A second waveguide core 52 adjacent to the first waveguide 46 at layer 50 comprises $Al_{0.2}Ga_{0.8}As$, and has a thickness of 0.103 μm, and comprises two graded refractive index steps 58 between the core and cladding thereof, each of thickness 0.09 μm and graded using the sinusoidal formula described above. An upper cladding 54 for the second waveguide, adjacent to the second waveguide core 52, comprises $Al_{0.5}Ga_{0.5}As$, and has a thickness of 1.0 μm. An outer layer 56, adjacent to the third waveguide 54 comprises GaAs and is 0.06 μm thick.

In the embodiments shown in FIGS. 7 and 9, the lower waveguide can support more than one optical guided mode. This behavior is generally undesirable. This mode is eliminated by choosing the thickness of the lowest $Al_{0.5}GaAs$ cladding layer such that the higher order modes preferentially leak into the high-index GaAs substrate. This design approach does not affect the losses of the fundamental waveguide mode.

The filter passbands quoted for the embodiments of FIGS. 7–9 neglect the effect of material dispersion, which is expected to reduce the passbands and the polarization shift of the filter wavelength by approximately two-fold. However, the polarization sensitivity, which is the ratio of polarization-induced shift to passband, is independent of the inclusion of dispersion effects in the simulations.

Changes and modifications in the specifically described embodiments can be carried out without departing from the scope of the invention, which is intended to be limited by the scope of the appended claims.

We claim:

1. A polarization-independent optical wavelength filter, comprising a directional coupler channel dropping filter comprising at least two waveguides of differing core refractive indices, birefringences and thicknesses brought into proximity such that light can couple from a thicker first waveguide of said at least two waveguides into a thinner second waveguide of said at least two waveguides, wherein said first waveguide comprises birefringent material with birefringence greater than the birefringence of said second waveguide by an amount adjusted so that the effective modal indices of said two waveguides exhibit about the same change with changing polarizations, wherein the birefringence of said second waveguide may be zero, wherein said optical wavelength filter is polarization-independent.

2. The filter of claim 1, wherein said birefringent material in the core of said thicker first waveguide comprises a layered composite of at least three layers.

3. The filter of claim 2, wherein said layered composite comprises III–V semiconductor material.

4. A polarization-independent optical wavelength filter, comprising a directional coupler channel dropping filter comprising at least two waveguides of differing core refractive indices, birefringences and thicknesses brought into proximity such that light can couple from a thicker first waveguide of said at least two waveguides into a thinner second waveguide of said at left two waveguides, wherein said first waveguide comprises birefringent material with birefringence greater than the birefringence of said second waveguide, wherein the birefringence of said second waveguide may be zero, wherein said optical wavelength filter is polarization-independent, wherein said birefringent material in the core of said thicker first waveguide comprises a layered composite of at least three layers, wherein said layered composite comprises a multiple quantum well.

5. The filter of claim 2, wherein said layered composite comprises alternating layers of different glasses.

6. The filter of claim 5, wherein said alternating layers of different glasses comprises alternating layers of $TiO_2$ and $SiO_2$.

7. The filter of claim 5, wherein said alternating layers of different glasses are deposited by a method selected from a group consisting of chemical vapor deposition and sputtering.

8. A polarization-independent optical wavelength filter, comprising a directional coupler channel dropping filter comprising at least two waveguides of differing core refractive indices, birefringences and thicknesses brought into proximity such that light can couple from a thicker first waveguide of said at least two waveguides into a thinner second waveguide of said at least two waveguides, wherein said first waveguide comprises birefringent material with birefringence greater than the birefringence of said second waveguide, wherein the birefringence of said second waveguide may be zero wherein said optical wavelength filter is polarization-independent, further comprising a grating located between said first waveguide and said second waveguide.

9. The filter of claim 8, wherein said grating is an etched grating.

10. The filter of claim 8, wherein said grating is acousto-optically generated.

11. The filter of claim 8, wherein said grating preserves a direction in which optical signals propagate within said filter.

12. The filter of claim 8, wherein said grating reverses a direction in which optical signals propagate within said filter.

13. The filter of claim 2, wherein said layered composite comprises material selected from a group consisting of AlGaAs, InGaAsP, InGaAlAs, GaAs, InP, doped silicon dioxide, undoped silicon dioxide, titanium dioxide, silicon nitride and aluminum oxide.

14. The filter of claim 2, wherein said layered composite comprises multilayers with at least two constituents.

15. The filter of claim 2, wherein said layered composite is stacked perpendicular to the optical axis of said first waveguide.

16. The filter of claim 1, wherein said birefringent material is formed by a process selected from a group consisting of strain-induced piezo-optic effects and electric-field induced electro-optic effects.

17. The filter of claim 1, wherein said first waveguide is thicker than said second waveguide.

18. A polarization-independent optical wavelength filter, comprising a directional coupler channel dropping filter comprising at least two waveguides of differing core refractive indices, birefringences and thicknesses brought into proximity such that light can couple from a thicker first Waveguide of said at least two waveguides into a thinner second waveguide of said at least two waveguides, wherein said first waveguide comprises birefringent material with birefringence greater than the birefringence of said second waveguide, wherein the birefringence of said second waveguide may be zero, wherein said optical wavelength filter is polarization-independent, wherein said birefringent material comprises a multilayer comprised of several periods, wherein each period of said periods comprises two layers, wherein each period has a thickness less than the optical wavelength of said filter.

19. The filter of claim 1, wherein said second waveguide has a thickness that maximizes the birefringence of said second waveguide.

20. The filter of claim 1, wherein said second waveguide has a thickness that minimizes the mode size of said second waveguide.

21. The filter of claim 1, wherein said second waveguide comprises a graded refractive index step between the cladding and the core of said second waveguide.

22. The filter of claim 1, wherein said birefringent material comprises a multilayer comprising two materials having the same thickness.

23. The filter of claim 1, wherein said filter has a length half-way between the optimum length for each polarization.

24. A polarization-independent optical wavelength filter, comprising a directional coupler channel dropping filter comprising at least two waveguides of differing core refractive indices, birefringence and thicknesses brought into proximity such that light can couple from a thicker first waveguide of said at least two waveguides into a thinner second waveguide of said at least two waveguides, wherein said first waveguide comprises birefringent material with birefringence greater than the birefringence of said second waveguide, wherein the birefringence of said second waveguide may be zero, wherein said optical wavelength filter is polarization-independent, wherein said first waveguide comprises a multiple quantum well.

25. The filter of claim 1, further comprising a substrate, wherein said first waveguide comprises a first layer and a second layer and a multiplicity of layers located therebetween, wherein said second waveguide is located adjacent to said first waveguide, and wherein said second waveguide further comprises an outer cladding layer.

26. A polarization-independent optical wavelength filter, comprising a directional coupler channel dropping filter comprising at least two waveguides of differing core refractive indices, birefringences and thicknesses brought into proximity such that light can couple from a thicker first waveguide of said at least two waveguides into a thinner second waveguide of said at least two waveguides, wherein said first waveguide comprises birefringent material with birefringence greater than the birefringence of said second waveguide, wherein the birefringence of said second waveguide may be zero, wherein said optical wavelength filter is polarization-independent, further comprising a substrate, wherein said first waveguide comprises a first layer and a second layer and a multiplicity of layers located therebetween, wherein said second waveguide is located adjacent to said first waveguide, and wherein said second waveguide further comprises an outer cladding layer, further comprising an outer layer located adjacent to said outer cladding layer of said second waveguide.

27. A polarization-independent optical wavelength filter, comprising a directional coupler channel dropping filter comprising at least two waveguides of differing core refractive indices, birefringences and thicknesses brought into proximity such that light can couple from a thicker first waveguide of said at least two waveguides into a thinner second waveguide of said at least two waveguides, wherein said first waveguide comprises birefringent material with birefringence greater than the birefringence of said second waveguide, wherein the birefringence of said second waveguide may be zero, wherein said optical wavelength filter is polarization-independent, further comprising a substrate, wherein said first waveguide comprises a first layer and a second layer and a multiplicity of layers located therebetween, wherein said second waveguide is located adjacent to said first waveguide, and wherein said second waveguide further comprises an outer cladding layer, wherein said substrate comprises $n^+$GaAs, said first layer of said first waveguide comprising $Al_{0.5}Ga_{0.5}As$ having a thickness of 0.65 µm, said multiplicity of layers comprising 17 layers, wherein each layer comprises $Al_{0.6}Ga_{0.4}As$ having a thickness of 11.5 nm and $Al_{0.2}Ga_{0.8}As$ having a thickness of 38.5 nm, said final layer comprising $Al_{0.5}Ga_{0.5}As$ having a thickness of 0.75 µm, said second waveguide comprising $Al_{0.2}Ga_{0.8}As$ having a thickness of 0.34 µm, and said outer cladding layer comprising $Al_{0.5}Ga_{0.5}As$ having a thickness of 0.17 µm.

28. The filter of claim 26, wherein said substrate comprises n⁺GaAs, said first layer of said first waveguide comprising $Al_{0.5}Ga_{0.5}As$ having a thickness of 1.3 μm, said multiplicity of layers comprising 10 layers, wherein each layer comprises $Al_{0.53}Ga_{0.47}As$ having a thickness of 28.6 nm and $Al_{0.2}Ga_{0.8}As$ having a thickness of 15.9 nm, said final layer comprising $Al_{0.5}Ga_{0.5}As$ having a thickness of 1.33 μm, said second waveguide comprising $Al_{0.2}Ga_{0.8}As$ having a thickness of 0.2 μm, said outer cladding layer comprising $Al_{0.5}Ga_{0.5}As$ having a thickness of 0.7 μm. and said outer layer comprising GaAs having a thickness of 0.06 μm.

29. The filter of claim 26, wherein said substrate comprises n⁺GaAs, said first layer of said first waveguide comprising $Al_{0.5}Ga_{0.5}As$ having a thickness of 1.06 μm, said multiplicity of layers comprising 20 layers, wherein each layer comprises $Al_{0.50}Ga_{0.50}As$ having a thickness of 15.7 nm and $Al_{0.2}Ga_{0.8}As$ having a thickness of 16.2 nm, said final layer comprising $Al_{0.5}Ga_{0.5}As$ having a thickness of 1.16 μm, said second waveguide comprising $Al_{0.2}Ga_{0.8}As$ having a thickness of 0.103 μm, wherein said second waveguide comprises graded refractive index steps between the core and the cladding of said second waveguide, said outer cladding layer comprising $Al_{0.5}Ga_{0.5}As$ having a thickness of 1.0 μm. and said outer layer comprising GaAs having a thickness of 0.06 μm.

30. The filter of claim 1, further comprising an integrated assembly comprising an optical amplifier, wherein said filter is positioned to receive light from said optical amplifier.

31. The filter of claim 1, further comprising a photodetector posititioned to receive light passing through said filter.

* * * * *